United States Patent Office 3,646,162
Patented Feb. 29, 1972

3,646,162
THERMOPLASTIC RESIN BLENDS OF POLY-
SULFONE AND A GRAFT DERIVATIVE OF A
BUTADIENE CONTAINING POLYMER SPINE
Robert L. Lauchlan, Granger, Ind., assignor to Uniroyal,
Inc., New York, N.Y.
No Drawing. Filed July 15, 1969, Ser. No. 842,002
Int. Cl. C08f 37/18, 41/12
U.S. Cl. 260—876 R                     4 Claims

ABSTRACT OF THE DISCLOSURE

Blends of thermoplastic polysulfone resin and a graft derivative of a butadiene containing polymer spine are characterized by an unusually useful combination of properties, particularly low temperature melt processability in combination with high impact strength and flexural strength.

FIELD OF THE INVENTION

This invention relates to blends of synthetic polymer compositions. More particularly, the invention relates to the blend which results from the physical admixing of a polysulfone resin with a graft derivative of a butadiene containing polymer spine.

SUMMARY OF THE INVENTION

There is a need for reasonably priced plastic compounds possessing the following properties: toughness, good mechanical strength, resistance to high temperatures, good melt processability and high impact strength over a wide range of temperatures. The present invention provides such a plastic compound, in the form of a blend of from 99% to 50% (all percentages are expressed by weight herein) of a thermoplastic polysulfone and correspondingly from 1% to 50% of a graft derivative of a butadiene containing polymer spine. The resulting blends exhibit thermoplastic properties including good melt processability and impact resistance without sacrificing the desirable heat distortion temperature and flexural strength of the unmodified polysulfone resin.

DESCRIPTION OF PREFERRED EMBODIMENTS

The matrix or predominate portion of the polyblend consists of a polysulfone resin. The matrix constitutes 50% or greater of the blend and preferably between 65% and 95% of the blend.

The polysulfone resin component of the blend of the invention may be described as a linear, thermoplastic polyarylene polyether polysulfone, wherein the arylene units are interspersed with ether and sulfone linkages. These resins may be obtained by reaction of an alkali metal double salt of a dihydric phenol and a dihalobenzenoid compound, either or both of which contain a sulfone linkage —SO$_2$— between arylene groupings, to provide sulfone units in the polymer chain in addition to arylene units and ether units. The polysulfone polymer has a basic structure composed of recurring units of the formula

—O—E—O—E'— wherein E is the residuum of the dihydric phenol and E' is the residuum of the benzenoid compound having an inert electron withdrawing group such as sulfone, carbonyl, vinyl, sulfoxide, azo, and saturated hydrocarbon group in at least one of the positions ortho and para to the valence bond; both of said residua are valently bonded to the ether oxygens through aromatic carbon atoms; at least one of said residua (E or E' or both) provides a sulfone linkage between aromatic carbon atoms. Such polysulfones are included within the class of polyarylene polyether resins described in U.S. Pat. 3,264,536, referred to above, the disclosure of which is hereby incorporated herein by reference for the purpose of describing and exemplifying E and E' in more detail, including the preferred forms of E derived from dinuclear phenols having the structure:

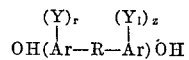

as defined therein, with the further limitation that either E or E' must be so selected, from the values of E and E' disclosed in said patent, as to contain a sulfone linkage to provide sulfone units in the final polymer chain. Thus, if E is so selected as not to contain the sulfone linkage, the E' must be selected from one of the forms containing sulfone linkage; if E' is so selected as not to contain a sulfone linkage, then E must be selected from one of the forms containing a sulfone linkage. Of course, E and E' may both contain sulfone linkage if desired. Typical preferred polymers are composed of recurring units having the formula

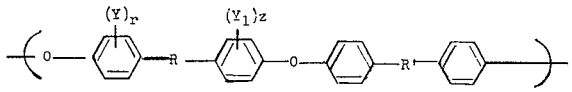

as described in the Robinson et al. patent, with the further proviso that at least one of R and R' must be —SO$_2$—. In the foregoing formula Y and Y$_1$ can be the same or different inert substituent groups as alkyl groups having from 1 to 4 carbon atoms, halogen atoms (i.e., fluorine, chlorine, bromine or iodine) or alkoxy radicals having from 1 to 4 carbon atoms, r and z are integers having a value of from 0 to 4, inclusive. Typically R is representative of a bond between aromatic carbon atoms or a divalent connecting radical and R' represents sulfone. Preferably R represents a bond between aromatic carbon atoms. Even more preferred are the thermoplastic polyarylene polysulfones of the above formula wherein r and z are zero, R is a divalent connecting radical of the formula

wherein R" represents, as exemplified in Robinson et al., a member of the group consisting of alkyl, lower aryl, and the halogen substituted groups thereof, and R' is a sulfone group.

Typical examples are the reaction products prepared from 2,2-bis(4-hydroxyphenyl) propane (source of E residue) with 4,4'-dichlorodiphenylsulfone (source of E' residue) and equivalent reaction products such as those from 4,4' - dichlorodiphenylsulfone with bisphenol of benxophenone (4,4' - dihydroxydiphenyl ketone) or the bisphenol of acetophone [1,1 - bis(4 - hydroxyphenyl) ethane], or the bisphenol of vinyl cyclohexane, [1-ethyl-1 - (4 - hydroxyphenyl) - 3 - (4 - hydroxyphenylcyclohexane] or 4,4'-dihydroxydiphenyl) sulfone, see Examples 1, 3, 4, 5 and 7 of Robinson et al.).

Further useful discussion of the polysulfone resins which may be used is to be found in British Pat. 1,060,546, referred to above. Ordinarily at least about 10% and preferably at least about 20% of the linkages between the arylene groups are sulfone groups

Apart from the ether and sulfone linkages, arylene groups may be bonded directly to each other or may be separated by inert groups, e.g., alkylidene groups such as isopropylidene groups, which latter appear in a chain when bisphenol A 2,2-bis(4-hydroxyphenyl) propane is used in the preparation of the polysulfone.

In the present discussion when naming the various additive graft copolymers, random copolymers are indicated by the prefix -co-, block copolymers by the prefix -b-, and graft copolymers by the prefix -g-. A more detailed discussion of this nomenclature is found in Graft Copolymers, Interscience Publishers, N.Y., 1967, pages 10–16.

The additive polymer which is blended with the polysulfone resin is a graft derivative of a butadiene-containing polymer spine. The butadiene-containing polymer spine may be polybutadiene, poly(butadiene-co-styrene), poly(butadiene-b-styrene) or poly(butadiene-co-acrylonitrile). In each polymer mentioned there is sufficient butadiene present to give the polymer a rubbery character.

The interpretation of the moduli of polymers presented in "Properties and Structures of Polymers," A. V. Tobolsky, pages 71–78, John Wiley & Sons, Inc., Publishers, copyright 1960 is adopted herein as the criteria for determining whether a polymeric material is a resin or a rubber.

Those polymeric materials which at ambient temperatures are leathery or rubber in nature and which, by reference to the aforementioned book, have Young's moduli between $10^5$ and $10^9$ dynes/cm.$^2$ are designated as rubbers.

Conversely those polymeric materials which at ambient temperatures possess glassy character, and which, by reference to the aforementioned book, have Young's moduli in excess of $10^9$ dynes/cm.$^2$ are designated as resins.

Constituents which may be grafted on to the butadiene-containing polymer spines are those having the general formula

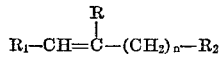

wherein R and $R_1$ each represent a substituent selected from the group consisting of hydrogen, halogen, an alkyl group having 1 to 4 carbon atoms, carboalkoxy, or R and $R_1$ compositely represent an anhydride linkage (—COOOC—), and $R_2$ is hydrogen, vinyl, an alkyl, alkenyl, cycloalkyl, carboalkoxy, alkoxy alkyl, alkyl carboxy, ketoxy, aryl all of which do not contain more than 12 carbon atoms, and the case of an alkyl group only one carbon atom need be present, halogen, carboxy, cyano, or pyridyl group and $n$ is an integer between 0 and 9.

Especially preferred monomers to be grafted on to the spine are the methacrylates such as methyl methacrylate ethyl methacrylate and the alkenyl aromatic compounds such as styrene, α-methylstyrene, the mono-, di-, tri-, tetra- and penta-chlorostyrenes and α-methylstyrenes, and the nuclearly alkylated styrenes and α-alkylstyrenes such as ortho- and para-methylstyrenes, ortho- and para-ethylstyrene, ortho- and para methyl-α-methyl styrene and the like.

Any of the methods for preparing the graft polymers found in Graft Copolymers by Battaerd and Tregear, N.Y. Interscience, 1967 may be used to prepare the graft polymers of the present invention.

Although a large number of compounds as described by the general formula listed above may be used by themselves or in combination with each other, further discussion of these compounds will be mainly in terms of methyl methacrylate and/or styrene. In the instance where two or more monomers are grafted onto the spine, the obvious criteria is that the monomers must be copolymerizable.

The object of this invention is to modify a polysulfone resin with an butadiene-containing polymer so that when comparing the blend with an unmodified polysulfone, the desirable heat distortion temperature and modulus of elasticity of unmodified polysulfone is substantially retained while the impact strength is increased.

The modulus of elasticity as measured according to the procedures in ASTM Test No. D790–66, is a measure of the stiffness or rigidity of a material. In general thermoplastics deform permanently when heavy loads are applied, and therefore a plastic with high modulus is preferred. Modulus decreases with an increase in temperature, and above the heat distortion temperature the modulus drops sharply.

The impact strength of a plastic as measured according to the procedure in ASTM Test D256–56 Method A, is a measure of its toughness in terms of its resistance to breakage under conditions of high velocity of an impacting object. The impact strength values are of practical importance since they provide quantitative differentiation of materials in terms of their resistance to fracture. In the present invention there is a slight sacrifice of modulus but this is negligible, when compared with the increase in impact strength. Of great importance in the present invention is the capability of providing a proper balance of properties in the blend to suit individual requirements or uses.

It is obvious from the comonomers which can be grafted on to the spine that the graft polymers possess a spectrum of moduli and thus the properties of said graft polymers will range from rubbery to resinous, and the polysulfone properties will be modified accordingly.

Thus the present invention provides a polysulfone whose properties can be tailored to satisfy the requirements of a particular intended use by selection of the appropriate monomers grafted on to the butadiene containing polymer spine.

To prepare the blend of the invention, the polysulfone and graft polymer may be mechanically blended together in the desired proportions with the aid of any suitable mixing device conventionally used for mixing rubbers or plastics, such as a differential roll mill, a Banbury mixer or an extruder. An internal shear mixer such as a Banbury mixer is preferred because of its ease of operation. In order to facilitate thorough mixing of the polymers and to develop the desired improved combination of physical properties, the mechanical blending is carried out at sufficiently high temperatures to soften the polymers so that they are thoroughly dispersed and intermingled with each other. As the polysulfone has the higher softening point, this temperature will govern the mixing temperature selected. Mixing is continued until a uniform blend is obtained.

Alternatively the polysulfone and graft polymer may be solution blended by dissolving the polymers in a suitable solvent, and subsequently precipitating the polymer blend by adding the solution into a miscible nonsolvent to produce a homogeneous dry blend.

The following examples illustrate the invention in greater detail and specifically show that upon the introduction of a graft copolymer into the polysulfone, the proportionate increase in the impact strength of the polyblend is significantly greater than the proportionate decrease in modulus of said polyblend.

EXAMPLE 1

This example illustrates the degree of impact improvement achieved by a blending a graft copolymer of methyl methacrylate on poly(butadiene-co-styrene) with polysulfone resin P–1700 at the 20% copolymer level. The particular graft copolymer employed contained 52% methyl methacrylate and 48% poly(butadiene-co-styrene), the latter containing 10% styrene. The graft copolymer was blended into the polysulfone at 425° F. on a differential roll mill for 18 minutes, and calendered at 425° F. The calendered product was molded at 400° F. and 20 tons pressure to make ¼ in. test samples.

As shown in Table 1, the notched Izod impact values are considerably higher than those of the resin at both +73° F. and —40° F. The heat distortion temperature, tensile properties flexural properties remain at acceptably high levels.

TABLE 1.—COMPARISON OF RESIN AND BLEND PROPERTIES

|  | 100% polysulfone | 80% polysulfone, 20 MMA/SBR [1] graft copolymer |
|---|---|---|
| ¼″ notched Izod, ft. lb./in.: |  |  |
| +73° F | 0.76 | 10.06 |
| —40° F | 0.86 | 2.62 |
| Heat distortion temperature, ° F., 264 p.s.i. | 341 | 321 |
| Tensile strength, p.s.i | 10,910 | 7,771 |
| Tensile modulus, p.s.i | 385,000 | 293,000 |
| Flexural strength, p.s.i | 17,700 | 12,266 |
| Flexural modulus | 425,000 | 312,000 |
| Rockwell hardness |  | 119 |

[1] The graft copolymer of methyl methacrylate on poly(butadiene-co-styrene) described above.

EXAMPLE 2

This example illustrates the degree of impact improvement achieved by blending a graft copolymer of styrene/methyl methacrylate on poly(butadene-co-styrene) with polysulfone resin P–1700 at the 20% copolymer level. The particular graft copolymer employed contained 52% methyl methacrylate, 12% styrene and 36% poly(butadiene-co-styrene), the latter containing 10% styrene. The graft copolymer was blended into the polysulfone at 425° F. on a differential roll mill for 14 minutes and calendered at 425° F. The calendered product was molded at 400° F. and 20 tons pressure to form ¼″ test samples. As shown in Table 2 the notched Izod impact values are considerably higher than those of the resin at +73° F. and —40° F. The heat distortion temperature, tensile properties and flexural properties remain at acceptably high values.

TABLE 2.—COMPARISON OF RESIN AND BLEND PROPERTIES

|  | 100% polysulfone | 80% polysulfone, 20% S/MMA/SBR [1] graft copolymer |
|---|---|---|
| ¼″ notched Izod, ft. lb./in.: |  |  |
| +73° F | 0.76 | 4.99 |
| —40° F | 0.86 | 1.39 |
| Heat distortion temperature, ° F., 264 p.s.i. | 341 | 319 |
| Tensile strength, p.s.i | 10,910 | 8,026 |
| Tensile modulus, p.s.i | 385,000 | 286,000 |
| Flexural strength, p.s.i | 17,700 | 12,472 |
| Flexural modulus | 425,000 | 344,000 |
| Rockwell hardness |  | 121 |

[1] The graft copolymer of styrene-methyl methacrylate on poly(butadiene-co-styrene) described above.

EXAMPLE 3

This example illustrates the degree of impact improvement achieved by blending a graft copolymer of methyl methacrylate on poly(butadiene-co-styrene) with polysulfone resin P–1700 at the levels indicated in Table 3. The particular graft copolymer employed contained 53% methyl methacrylate and 48% poly(butadiene co-styrene), the latter containing 10% styrene.

The polymer were blended, calendered and molded using the procedure described in Example 1.

As shown in Table 3, the notched Izod values are considerably higher than those of the resin at +73° F. The heat distortion temperature, tensile properties and flexural properties remain at acceptably high levels.

TABLE 3.—COMPARISON OF RESIN AND BLEND PROPERTIES

|  | 100% polysulfone | 90% polysulfone, 10% MMA/SBR [1] | 80% polysulfone, 20% MMA/SBR [1] | 70% polysulfone, 30% MMA/SBR [1] |
|---|---|---|---|---|
| ¼″ notch Izod, ft. lb./in.: +73° F | 0.76 | 1.03 | 10.0 | 4.6 |
| Heat distortion temperature, ° F., 264 p.s.i. | 341 | 324 | 323 | 311 |
| Tensile strength, p.s.i | 10,910 | 9,300 | 6,900 | 6,900 |
| Tensile modulus, p.s.i | 385,000 | 320,000 | 293,000 | 245,000 |
| Flexural strength, p.s.i | 17,700 | 13,900 | 12,200 | 9,000 |
| Flexural modulus | 425,000 | 355,000 | 312,000 | 266,000 |
| Rockwell hardness |  | 123 | 114 | 111 |
| Percent elongation at break | 5 | 14.3 | 46.7 | 60.7 |

[1] The ploy(butadiene-co-styrene-g-methyl methacrylate) described above. Similar improvements in impact strength are observed with polyblends containing up to 50% of this graft copolymer.

EXAMPLE 4

This example illustrates the degree of impact improvement achieved by blending a graft copolymer of methyl methacrylate-styrene on poly(butadiene-co-styrene) with polysulfone resin P–1700 at the level indicated in Table 4. The particular graft copolymer employed contained 52% methyl methacrylate 12% styrene and 36% poly(butadiene-co-styrene), the latter containing 10% styrene.

The polymers were blended, calendered and molded using the procedure described in Example 1.

As shown in Table 4, the notched Izod impact values are considerably higher than those of the resin at both +73° F. and —40° F. The heat distortion temperature, tensile properties and flexural properties remain at acceptably high levels.

TABLE 4.—COMPARISON OF RESIN AND BLEND PROPERTIES

|  | 100% polysulfone | 80% polysulfone, 20% MMA/S/SBR [1] |
|---|---|---|
| ¼″ notch Izod, ft. lb./in.: |  |  |
| +73° F | 0.76 | 5.0 |
| —40° F | 0.86 | 1.4 |
| Heat distortion temperature, ° F., 264 p.s.i. | 341 | .319 |
| Tensile strength, p.s.i | 10,910 | 8,026 |
| Tensile modulus, p.s.i | 385,000 | 286,400 |
| Flexural strength, p.s.i | 17,700 | 12,500 |
| Flexural modulus | 425,000 | 344,300 |
| Rockwell hardness |  | 121 |
| Percent elongation at break | 5 | 33 |

[1] The poly(butadiene-co-styrene-g-methyl methacrylate-co-styrene) described above.

EXAMPLE 5

This example illustrates the degree of impact improvement achieved by blending a graft copolymer of styrene-methyl methacrylate on poly(butadiene-co-styrene) with polysulfone resin P–1700 at the level indicated in Table 5. The particular graft copolymer employed contained 26% styrene, 26% methyl methacrylate and 48% poly(butadiene-co-styrene), the latter containing 10% styrene.

The polymers were blended, calendered and molded using the procedure described in Example 1.

As shown in Table 5, the notched Izod impact values are considerably higher than those of the resin at both +73° F. and —40° F. The heat distortion temperature tensile properties and flexural properties remain at acceptably high levels.

TABLE 5.—COMPARISON OF RESIN AND BLEND PROPERTIES

|  | 100% polysulfone | 80% polysulfone, 20% MMA/ S/SBR [1] |
|---|---|---|
| ¼″ notch Izod, ft. lb./in.: | | |
| +73° F | 0.76 | 2.78 |
| -40° F | 0.86 | 1.09 |
| Heat distortion temperature, ° F., 264 p.s.i. | 341 | 321 |
| Tensile strength, p.s.i. | 10,910 | 6,120 |
| Tensile modulus, p.s.i. | 385,000 | 263,000 |
| Flexural strength, p.s.i. | 17,700 | 9,940 |
| Flexural modulus | 425,000 | 296,000 |
| Rockwell hardness | | 113 |
| Percent elongation at break | 5 | 12.3 |

[1] The poly(butadiene-co-styrene-g-styrene-co-methyl methacrylate) described above.

EXAMPLE 6

This example illustrates the degree of impact improvement achieved by blending a graft copolymer of methyl methacrylate on poly(butadiene-co-styrene) with polysulfone resin P-1700 at the level indicated in Table 6. The particular graft copolymer employed contained 25% methyl methacrylate and 75% poly(butadiene-co-styrene), the latter containing 10% styrene.

The polymers were blended, calendered and molded using the procedure described in Example 1.

As shown in Table 6, the notched Izod impact values are considerably higher than those of the resin at +73° F. The heat distortion temperature, tensile properties and flexural properties remain at acceptably high levels.

TABLE 6.—COMPARISON OF RESIN AND BLEND PROPERTIES

|  | 100% polysulfone | 80% polysulfone, 20% MMA/SBR [1] |
|---|---|---|
| ¼″ notch Izod, ft. lb./in.: +73° F | 0.76 | 3.49 |
| Heat distortion temperature ° F., 264 p.s.i. | 341 | 318 |
| Tensile strength, p.s.i. | 10,910 | 6,025 |
| Tensile modulus, p.s.i. | 385,000 | 233,000 |
| Flexural strength, p.s.i. | 17,700 | 9,350 |
| Flexural modulus | 425,000 | 250,400 |
| Rockwell hardness | | 109 |
| Percent elongation at break | 5 | 37.3 |

[1] The poly(butadiene-co-styrene-g-methyl methacrylate) described above.

EXAMPLE 7

This example illustrates the degree of impact improvement achieved by blending a graft copolymer of methyl methacrylate on poly(butadiene-co-styrene) with polysulfone resin P-1700 at the level indicated in Table 7. The particular graft copolymer employed contained 75% methyl methacrylate and 25% poly(butadiene-co-styrene), calendered and molded using the procedure described in Example 1.

As shown in Table 7, the notched Izod impact values are considerably higher than those of the resin at +73° F. The heat distortion temperature, tensile properties and flexural properties remain at acceptably high levels.

TABLE 7.—COMPARISON OF RESIN AND BLEND PROPERTIES

|  | 100% polysulfone | 80% polysulfone, 20% MMA/SBR [1] |
|---|---|---|
| ¼″ notch Izod, ft. lb./in.: +73° F | 0.76 | 1.40 |
| Heat distortion temperature, ° F., 264 p.s.i. | 341 | 316 |
| Tensile strength, p.s.i. | 10,910 | 8,860 |
| Tensile modulus, p.s.i. | 385,000 | 332,000 |
| Flexural strength, p.s.i. | 17,700 | 13,323 |
| Flexural modulus | 425,000 | 343,000 |
| Rockwell hardness | | 123 |
| Percent elongation at break | 5 | 37.3 |

[1] The poly(butyadiene-co-styrene-g-methyl methacrylate) described above.

The mixtures of this invention may contain certain other additives to plasticize, extend, lubricate, prevent oxidation of, etc. the mixture and can also include flammability retarding agents, dyes, pigments, etc. Such additives are well known in the art and may be incorporated without departing from the scope of the invention.

The following ASTM tests were used to determine the date disclosed in the examples: notched Izod impact (D256–56 Method A); flexural strength and modulus (D-638–64T); heat distortion at 264 p.s.i. fiber stress (D-648–56); Rockwell hardness (785-65).

Having thus described our invention, what I claim and desire to protect by Letters Patent is:

1. A synthetic thermoplastic resin composition comprising a blend of:
   (A) from about 50% to 99%, based upon the total weight of composition, of a linear thermoplastic polyarylene polyether polysulfone resin composed of recurring units having the formula

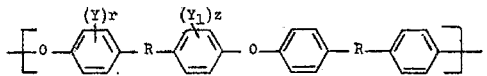

wherein R represents a member of the group consisting of a bond between aromatic carbon atoms and a divalent connecting radical and R' represents sulfone, Y and $Y_1$ each represent inert substituent groups selected from the group consisting of halogen, alkyl groups having from 1 to 4 carbon atoms and alkoxy groups having from 1 to 4 carbon atoms and where r and z are integers having a value from 0 to 4 inclusive, in admixture with,
   (B) correspondingly from about 1% to 50% based upon the total weight of composition of a butadiene-containing polymer spine having a Young's modulus between about $10^5$ and $10^9$ dynes/cm.$^2$ and selected from the group consisting of poly(butadiene) and poly(butadiene-co-styrene), which is grafted solely with methyl methacrylate.

2. The resin composition of claim 1 wherein (A) is composed of recurring units having the formula:

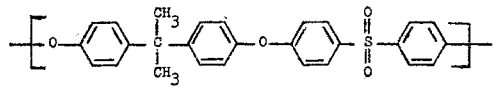

3. The resin composition of claim 2, wherein the butadiene-containing polymer spine in (B) is poly(butadiene).

4. The resin composition of claim 2, wherein the butadiene-containing polymer spine in (B) is poly(butadiene-co-styrene).

References Cited
UNITED STATES PATENTS

| 3,510,415 | 5/1970 | Barth | 260—49 X |
| 3,472,810 | 10/1969 | Gowan | 260—897 X |
| 3,405,199 | 10/1968 | Snedeker | 260—897 X |
| 3,400,065 | 9/1968 | Barth | 204—159.2 |
| 3,300,545 | 1/1967 | Baer | 260—876 |
| 3,162,695 | 12/1964 | Grabowski | 260—876 X |
| 2,943,074 | 6/1960 | Feuer | 260—876 X |
| 3,555,119 | 1/1971 | Ingulli et al. | 260—876 |

MURRAY TILLMAN, Primary Examiner

H. W. ROBERTS, Assistant Examiner

U.S. Cl. X.R.

260—49, 876 B, 879, 880 R,B